United States Patent

Iwasaki

[11] Patent Number: 6,013,220
[45] Date of Patent: Jan. 11, 2000

[54] METHOD OF MANUFACTURING A MAGNETIC TAPE

[75] Inventor: Osamu Iwasaki, Odawara, Japan

[73] Assignee: Fuji Photo Film Co., Ltd., Japan

[21] Appl. No.: 09/026,414

[22] Filed: Feb. 18, 1998

[30] Foreign Application Priority Data

Feb. 19, 1997 [JP] Japan .................................. 9-034860

[51] Int. Cl.$^7$ .................................................. B23K 26/00
[52] U.S. Cl. ................... 264/400; 264/146; 219/121.67; 219/121.69
[58] Field of Search ................... 264/400, 146; 219/121.61, 121.67, 121.68, 121.69

[56] References Cited

U.S. PATENT DOCUMENTS

| | | | |
|---|---|---|---|
| 5,164,243 | 11/1992 | Kanazawa et al | 428/192 |
| 5,363,267 | 11/1994 | Fang | 360/128 |
| 5,840,239 | 11/1998 | Partanen et al. | 264/401 |

FOREIGN PATENT DOCUMENTS

| | | |
|---|---|---|
| 64-78426 | 3/1989 | Japan . |
| 64-78427 | 3/1989 | Japan . |
| 10-154322 | 6/1998 | Japan . |

*Primary Examiner*—Jan H. Silbaugh
*Assistant Examiner*—Stefan Staicovici
*Attorney, Agent, or Firm*—Brinks Hofer Gilson & Lione; G. Peter Nichols

[57] ABSTRACT

A magnetic tape, in which a protrusion on a magnetic layer or a back layer on a cutting surface of the magnetic tape is eliminated. When a magnetic tape T comprising a magnetic layer 22, a base layer 21 and a back layer 23 is cut to a predetermined width, protrusion of the magnetic layer 22 or the back layer 23 is formed on the end surface of the magnetic tape T. Ultraviolet laser or visible laser is irradiated on the end surface while the magnetic tape T is running to eliminate the protrusion and the end surface is shaped to have cross-section of approximately rectangular or approximately circular shape.

15 Claims, 5 Drawing Sheets

(Rectangular)

(Circular)

1 Ultraviolet laser
2 Half mirror
3 Mirror
4 Focusing lens for the optical fiber
5 Optical fiber for ultraviolet laser
6 Collimator lens
7 Intensity distribution filter
8 Condenser lens LB Laser beam
T Magnetic tape
TG Tape guide
9 Optical head 10 Collimator lens
11 Light quantity distribution filter
12 Cylindrial lens
13 Optical head
T  Magnetic tape
5  Optical fiber

METHOD OF MANUFACTURING A MAGNETIC TAPE

BACKGROUND OF THE INVENTION

The present invention relates to a magnetic tape and a method for manufacturing said magnetic tape, and in particular to a method for shaping and fabricating end surfaces of a magnetic tape by laser and also to a magnetic tape manufactured by said method.

A magnetic tape for video tape recorder is manufactured as follows: a magnetic film of 3-layer structure comprises a magnetic layer and a back layer coated on each side of a support layer called a base layer, and it is cut off to a predetermined dimension by a cutting process called slitter process.

In the slitter process, the magnetic film is cut off using a metal rotary cutter. The rotary cutter has an upper blade and a lower blade. Depending on engaging dimensions of these two blades and on cutting speed, cutting surface may be entirely different from the surface as originally desired, e.g. the magnetic layer may protrude more than the other layer on the cutting surface of the upper blade side, or the back layer may protrude more than the other layer on the cutting surface of the lower blade side.

The problems at the cutting as described above may cause further troubles: When the tape is used in practical application, the protruded portion of the magnetic tape may be turned to thread-like chips as the protruded portion is scraped off by guide roller and the like of the magnetic tape, thereby causing filling-up of magnetic head, or drop-out of signal may occur, and the desired voltage cannot be obtained in recording or reproducing signals, or trouble may occur to the running of tape due to deterioration in rolling shape or conditions even when scraping does not occur and tape edge may be seriously damaged and recording cannot be achieved on that portion. In particular, protrusion of the back layer causes scraping of tape to thread-like chips, and it is necessary to eliminate this protrusion by some method.

SUMMARY OF THE INVENTION

To solve the above problems, it is an object of the present invention to provide a magnetic tip,. in which it is possible to eliminate protrusion of the magnetic layer or the back layer on cutting surface of the magnetic tape and a method to produce such a magnetic tape.

To attain the above object, the method for manufacturing a magnetic tape according to the present invention is characterized in that at least one of ultraviolet laser beam or visible laser beam is irradiated to end surface of a magnetic tape, which is cut to a predetermined width, while the magnetic tape is running, and that at least a part of a protrusion of the end surface is eliminated.

In this case, spatial intensity distribution may be given to ultraviolet laser beam or visible laser beam irradiated to the end surface of the magnetic tape depending upon the condition of the end surface. The detailed description will be given later.

In case it is supposed that ultraviolet laser beam is a pulse light and pulse frequency is Pf, running speed of the magnetic tape is Ts, and irradiation width of ultraviolet laser beam or visible laser beam in the running direction of the magnetic tape is LBw, the following relationship may be established:

$$Ts \leq Pf \times LBw$$

The magnetic tape according to the present invention is manufactured by the method for manufacturing a magnetic tape as described above, and it is a magnetic tape which has end surface with approximately rectangular or circular cross-section after irradiation of laser beam.

By the method for manufacturing the magnetic tape according to the present invention, protrusion of edge of the magnetic tape is shaped and fabricated to approximately rectangular or circular shape. In the magnetic tape as described above, thread-like chips are not generated during tape running in actual application. Accordingly, it is possible to reduce filling-up of the magnetic head and to prevent signal drop-out. Further, it is possible to eliminate poor rolling shape and condition of the tape caused by protrusion of tape edge as seen in conventional type magnetic tape, to improve running performance of the tape, and to prevent damage of the tape itself, and further to ensure stabilized recording and reproducing operation.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

DESCRIPTION OF THE PREFERRED EMBODIMENTS

In the following, description will be given on a method for manufacturing a magnetic tape according to the present invention and embodiments of magnetic tape manufactured by this method, referring to the attached drawings.

Figure 1:
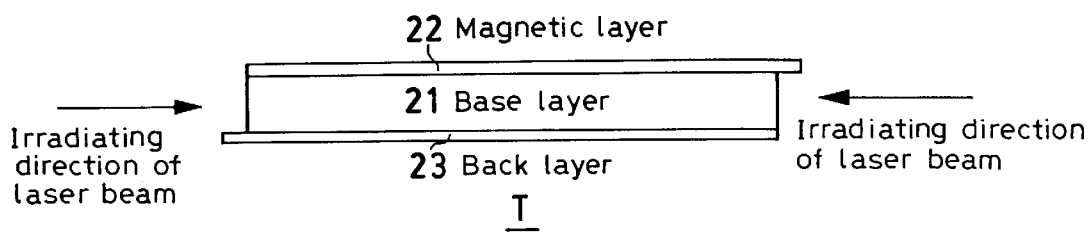
FIG. 1 is a cross-sectional view to explain principle of a method for manufacturing a magnetic tape according to the present invention.
Figure 2:
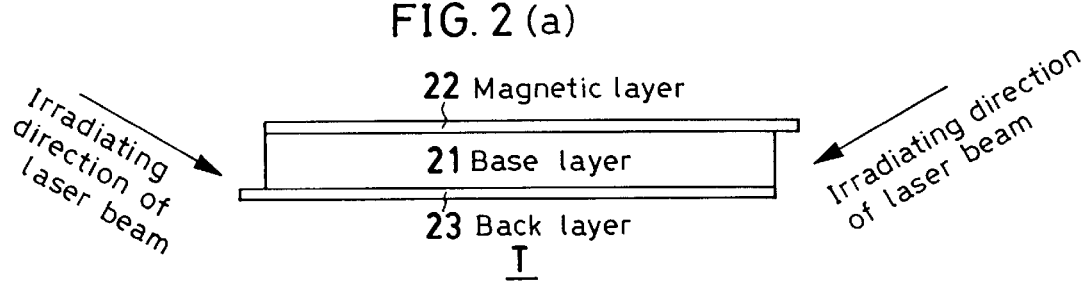
FIG. 2 represents cross-sectional views to explain variations with different irradiating directions of laser beam.
Figure 2:
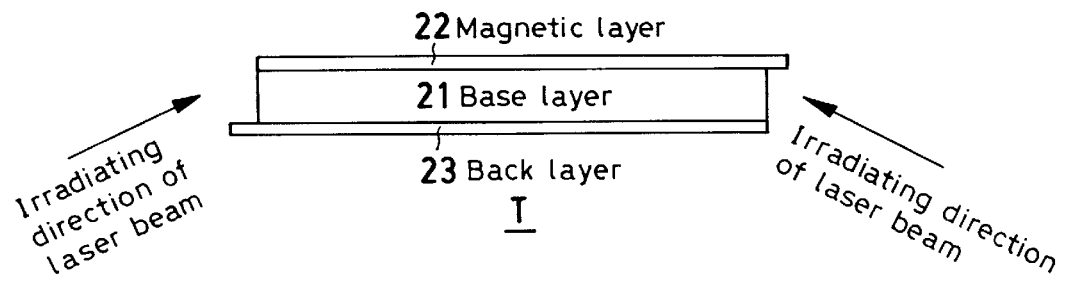
Figure 3A:
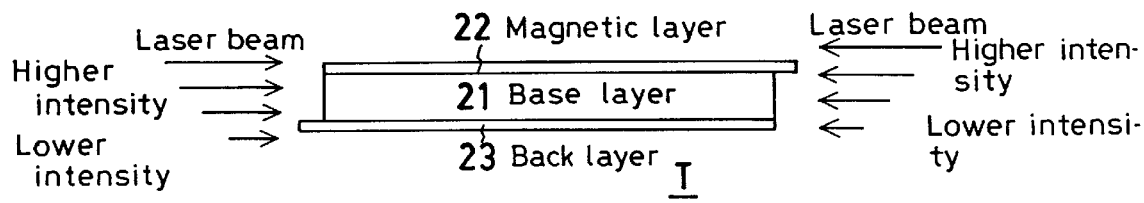
FIG. 3 represents cross-sectional views to explain variations with different intensity distributions to laser beam.
Figure 3B:
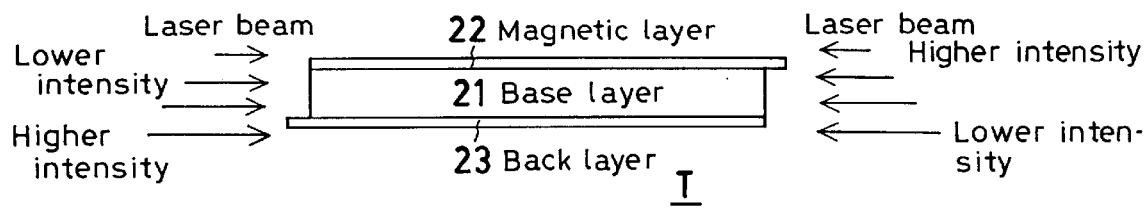

FIG. 1 represents a cross-sectional view of a magnetic tape T, which comprises 3 layers, i.e. a magnetic layer 22, a base layer 21 and a back layer 23. During slitter process in the manufacturing, the magnetic tape T is cut off to a predetermined dimension using metal rotary cutter or other means. FIG. 1 shows vertical cross-section in longitudinal direction (running direction) of the magnetic tape after cutting. Although not shown in the figure, the rotary cutter has an upper blade and a lower blade, and it is designed in such manner that the cutter is brought into contact with the magnetic tape from upper and lower sides of the magnetic tape T. Depending on the engaging condition and the cutting speed of the upper and the lower blades of the rotary cutter, end portion of the magnetic tape T may protrude, e.g. the magnetic layer 22 may protrude more than the other layer on the cutting surface as shown at the right end of the magnetic tape T in FIG. 1 or the back layer 23 may be protruded more than the other layer as shown at the left end of the magnetic tape T in FIG. 1. As already explained, this protrusion causes various problems such as producing of thread-like chips during actual application of the tape.

Figure 4A:
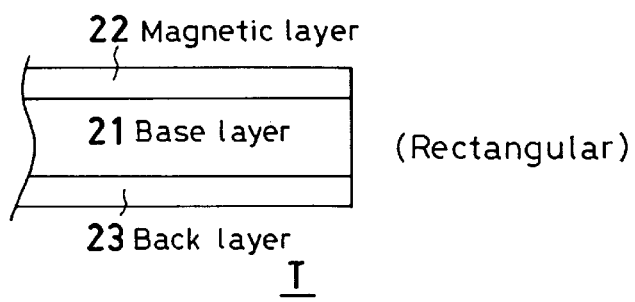
FIG. 4 represents cross-sectional views of end surface of a magnetic tape shaped by the method of the present invention.

According to the present invention, laser beam is irradiated from lateral direction (i.e. from a direction along the tape approximately perpendicular to the running direction of the tape) to the cutting surface of the magnetic tape T after cutting, and the protrusion is removed and eliminated. Cross-section of the end portion of the magnetic tape T after laser irradiation is in approximately rectangular shape as shown in FIG. 4 (a).

In case ultraviolet ray is used as the laser beam to be irradiated to the magnetic tape, it is particularly preferable to use ultraviolet laser beam with such a wavelength (360 nm or less; preferably, 172 to 355 nm) as to provide energy higher than binding energy of macromolecular compound, which is the material of the magnetic tape T. The reasons for this are as follows: laser used for conventional cutting process, surface treatment, etc. is $CO_2$ laser, YAG laser, etc. of infrared region. In these types of laser, functions as heat source is utilized for the purpose, and it is difficult to apply these types of laser to a material such as the magnetic tape, which has very low heat resistant property. On the other hand, visible laser provides good effects in addition to the ultraviolet laser. Using the visible laser, it is possible to narrow down pulse width more than $CO_2$ laser or YAG laser as described above. Because introduction of optical energy into the specimen is decreased and heat transfer into the specimen is reduced, visible laser can also be applied to a material such as magnetic tape, which has very low heat resistant property. As the visible laser beam, He—Cd laser ($\lambda$=451 nm) or second harmonic ($\lambda$=532 nm) of YAG laser may be used. He—Ne laser or the so-called low power visible laser for measurement or for recording and reproducing of compact disk, DVD, etc. are not included.

The laser beam can be irradiated not only in lateral direction of the magnetic tape T as shown in FIG. 1 but it can be irradiated with a certain tilt angle to cross-section of the edge of the tape T.

In intensity distribution of the irradiated laser beam, the laser beam may be irradiated with higher intensity to the magnetic layer 22 and with lower intensity to the back layer 23. On the contrary, the laser beam may be irradiated with lower intensity to the magnetic layer 22 and with higher intensity to the back layer 23.

Figure 4B:
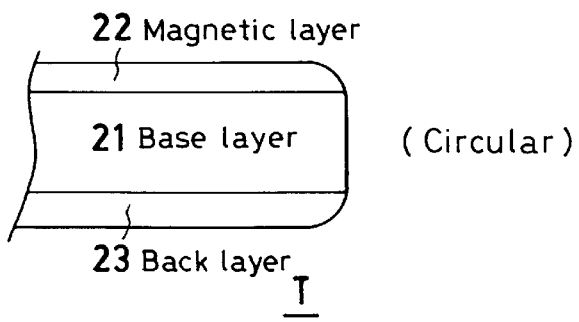

The irradiating direction of intensity distribution of the laser beam can be adequately selected for each purpose, e.g. to shape the end portion of the magnetic tape T in approximately circular shape as shown in FIG. 4(b) or to shape only a specific layer to inner portion than the base layer 21 (not shown). Depending on the thickness of the magnetic layer 22 or the back layer 23 or on the property of these materials, irradiating direction and intensity distribution of laser beam can be combined together as necessary.

Figure 5A:
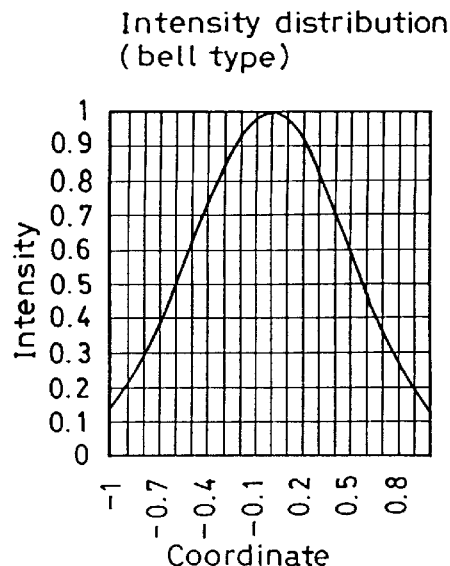
FIG. 5 represents diagrams to indicate intensity distribution of irradiated laser beams.
Figure 5B:
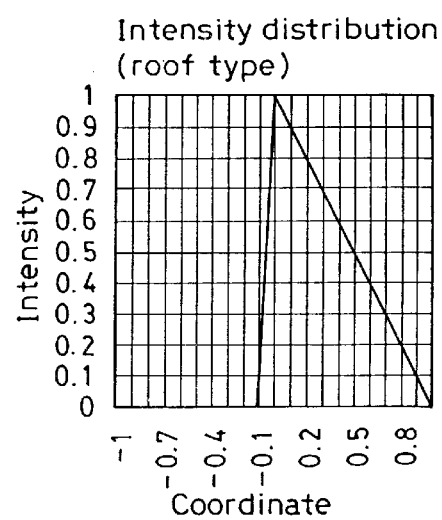
Figure 5C:
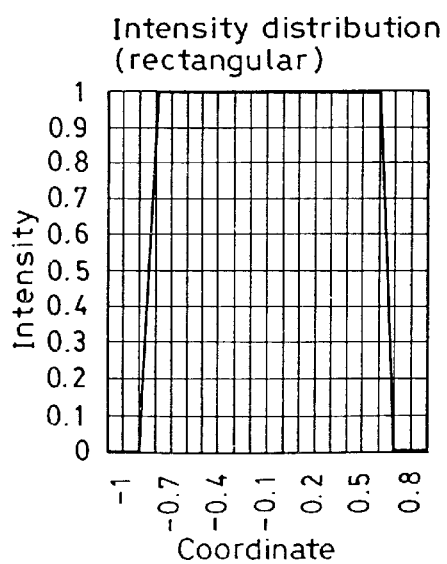

As examples of intensity distribution of the irradiating laser beam, there are bell type as shown in FIG. 5(a), roof type as shown in FIG. 5(b), or rectangular type as shown in FIG. 5(c).

Figure 6A:
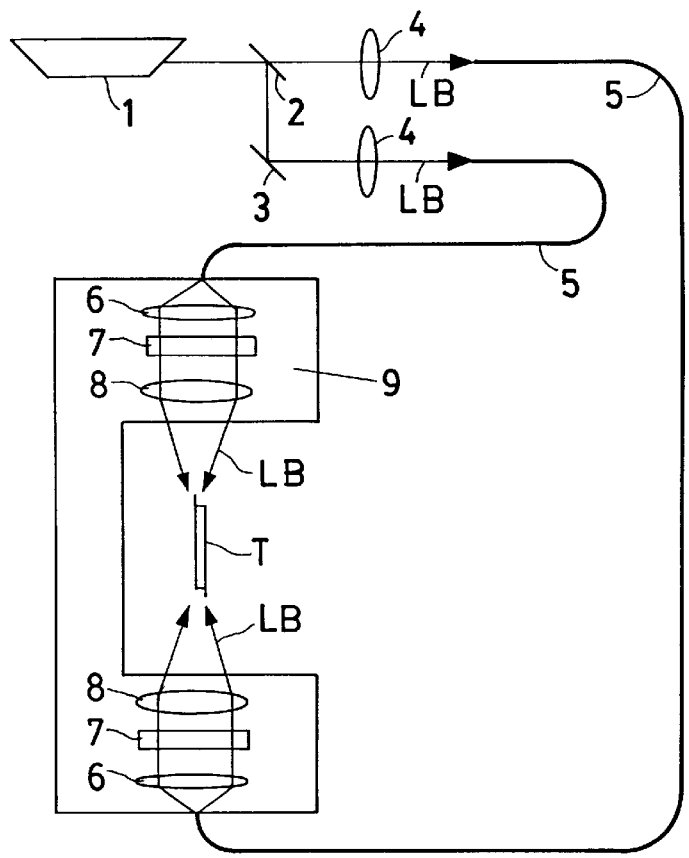
FIG. 6 represents an example of a manufacturing apparatus used in the method for manufacturing the magnetic tape of the present invention.
Figure 6B:
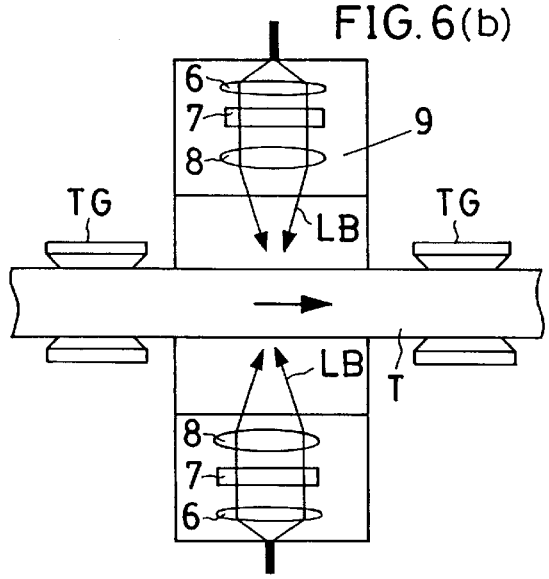

Next, description will be given on an example of a manufacturing apparatus to shape and fabricate the end surface of the magnetic tape T using laser beam, referring to FIG. 6. FIG. 6(a) shows the magnetic tape T advancing in an optical head 9 of a laser fabricating apparatus in the longitudinal direction of the magnetic tape T as seen from the running direction of the tape. FIG. 6(b) shows a portion of the optical head 9 of the same apparatus as seen from a direction perpendicular to the plane of the magnetic tape T.

As shown in FIG. 6(b), the magnetic tape T, cut to a predetermined width, is moved toward the right in the figure at a predetermined speed by a tape guide TG, which comprises an idle roller and the like. In the optical head 9, ultraviolet laser beam LB is irradiated to edge portion of the magnetic tape T while moving from both sides.

Description is now given on optical system of the irradiation of ultraviolet laser beam LB. As shown in FIG. 6(a), the laser beam LB from the ultraviolet laser 1 is split to two laser beams LB by a beam splitter such as a half mirror 2, and one of them enters an optical fiber 5 directly via a lens 4 for entering optical fiber and the other is irradiated to the optical fiber 5 via a mirror 3 and a lens 4 for entering optical fiber. By utilizing the optical fiber 5, it is possible to give a certain degree of freedom to the arrangement and the position of the ultraviolet laser 1 and the optical head 9. The laser beam LB is propagated through the optical fiber 5 and exits from the other end surface. The laser beam LB coming out of the optical fiber 5 passes through a collimator lens 6, an intensity distribution filter 7, and a condenser lens 8 in this order and is shaped to a predetermined beam configuration and intensity distribution, and it is further irradiated to edge portions on both sides of the magnetic tape T. The laser beams LB to be irradiated to both sides of the magnetic tape T may be deviated to some extent to each other in the running direction of the magnetic tap T and the optical systems on both sides may be deviated to each other in order that the upper beam (in the figure) does not enter again the optical system of the lower beam.

Figures 7A, 7B:
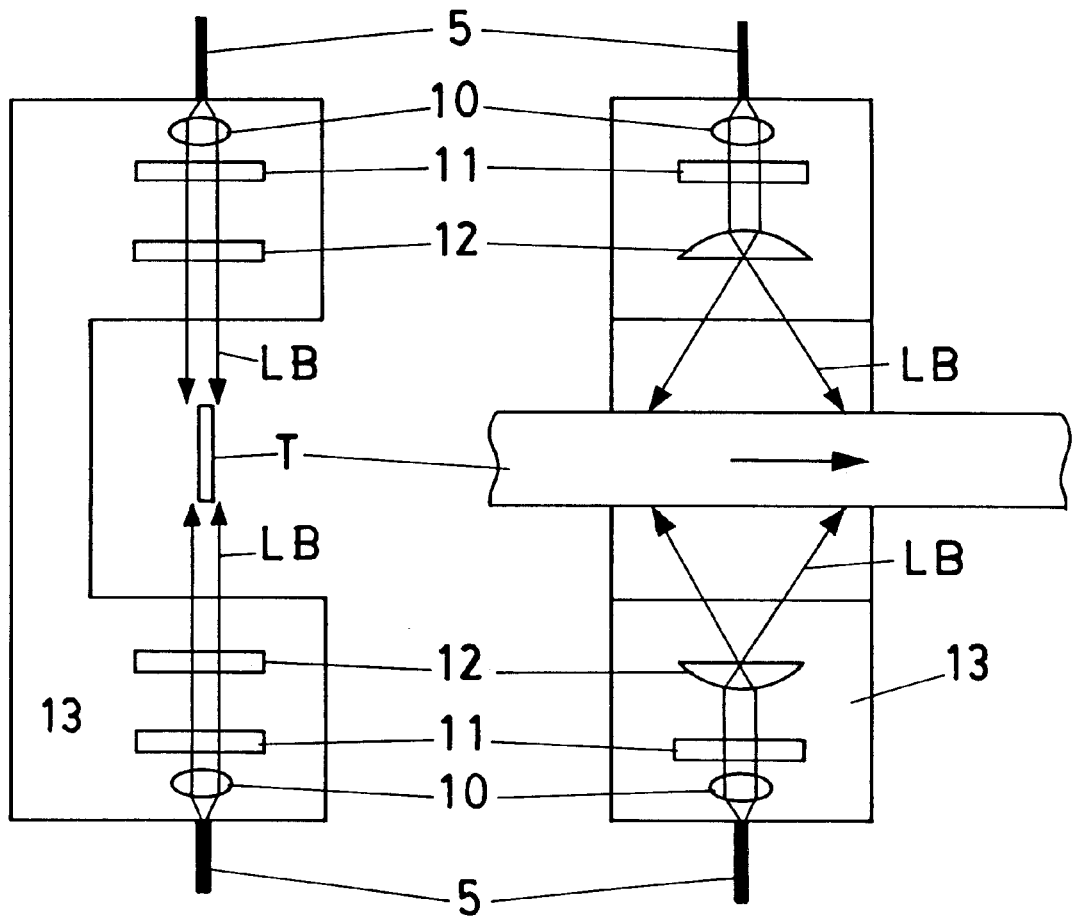
FIG. 7 is a drawing to explain another example of an optical head of a laser fabricating apparatus.

FIG. 7 represents another embodiment of the optical system to irradiate the laser beam LB. FIG. 7(a) represents condition of the magnetic tape T moving in longitudinal direction of the tape in an optical head 13 of a laser fabricating apparatus as seen from a direction facing to the running direction. FIG. 7(b) shows a portion of the optical head 13 of the same apparatus as seen from a direction perpendicular to the plane of the magnetic tape T. Similarly to FIG. 6, laser beam LB coming out of an optical fiber passes through a collimator lens 10, an intensity distribution filter 11, and a cylindrical lens 12 arranged in the optical head 13 and is irradiated in longitudinal direction of the magnetic tape T, and the laser beam LB thus spread is irradiated from both sides of the magnetic tape T.

In FIG. 6 and FIG. 7, to change the irradiating direction of the laser beam LB to the magnetic tape T, the angle of the magnetic tape T with respect to the optical heads 9 or 13 may be changed by the tape guide TG or other means or the optical heads 9 and 13 themselves or lens and the like in the optical heads 9 and 13 may be displaced.

Next, description will be given on concrete examples. As ultraviolet laser 1, ultraviolet excimer laser (wavelength: 248 nm) was adopted, and pulse oscillation performed. It is preferable that the pulse frequency is within the range of 10 to 200 Hz from the viewpoint to provide stable pulse oscillation. In this case, pulse was oscillated at a frequency of 100 Hz. Energy density of the laser 1 was 1.0 $J/cm^2$ in the range of 0.5 to 5 $J/cm^2$. It is preferable that the shape of the beam LB irradiated to the magnetic tape T from the optical system is in rectangular shape, and the shape of 1×100 $mm^2$ was adopted.

As the magnetic tape T running in the optical heads 9 and 13, polyethylene terephthalate material of 10.0 μm in thickness was used on a base layer 21, which serves as a support member, and this was applied on a magnetic recording layer 22 of 3.0 μm in thickness and a back coat layer 23 of 0.5 μm in thickness.

Running speed of the magnetic tape T varies according to the aspects of process such as slitter process of the magnetic tape T, or laser shaping process of the present invention. The running speed is preferably 10 to 1000 m/min. or more preferably 20 to 700 m/min.

In case edges of the magnetic tape T are continuously shaped and fabricated using pulse laser, it is necessary to set the condition to satisfy the following relationship:

$$TS \leq Pf \times LBw$$

Where Pf represents pulse frequency, Ts represents tape speed, and LBw represents irradiation width of the laser beam LB in the running direction (longitudinal direction) of the magnetic tape T. If this condition is satisfied, the processed surface becomes continuous, and it is not spot-like.

By taking these factors into account, the running speed of the magnetic tape T was set to 600 m/min. in the present embodiment.

By the above setting condition, it was confirmed that the edges of the magnetic tape T can be shaped in approximately rectangular shape and that protrusion occurred during cutting was completely eliminated.

In another concrete example, ultraviolet Ar ion laser, i.e. continuous wave laser, was used instead of the pulse oscillation laser. Oscillation spectrum is within the range of 303.3 to 335.8 nm because longitudinal mode of wavelength was multi-mode. Power density of the laser was selected as 1 W/mm$^2$ in the range of 0.5 to 5 W/mm$^2$, and as spot-like shape, circular shape of 20 μm of the laser beam was selected from the range of 20 to 30 μm. The other factors, i.e. shape and material of the magnetic tape T and tape running speed were the same as in the above embodiment. In this case, also, it was confirmed that the edges of the magnetic tape T were formed in approximately rectangular shape and protrusion occurred during cutting was completely eliminated.

Therefore, by the method of the present invention, in which ultraviolet laser is irradiated to end surface of a magnetic tape, cut in a predetermined width, while the magnetic tape is running and protrusion on the end surface is eliminated, and it is possible to shape and fabricate the magnetic tape so that the end surface of the tape is shaped and fabricated in approximately rectangular shape or in approximately circular shape.

As variation of the present invention, it is possible to make the ultraviolet laser assist visible laser (by overlapping visible laser on the ultraviolet laser in the laser beam) or, on the contrary, it is possible to make visible laser assist ultraviolet laser and to obtain better effect in shaping and fabricating of the laser beam.

Also, it is possible to add some heating process by simultaneous use of the above laser and infrared laser (YAG laser, $CO_2$ laser, etc.) and to shape the edge portions of the magnetic tape more smoothly and to reduce the time to eliminate the protrusion.

Further, it is needless to say that pulse laser beam and continuous wave laser beam can be simultaneously used.

As it is evident from the above description, it is possible according to the present invention to shape and fabricate the end surface of the magnetic tape so that it has cross-section of approximately rectangular shape or approximately circular shape. In the magnetic tape thus produced, thread-like chips are not generated during the running operation of the tape in actual application, and this makes it possible to reduce filling-up of the magnetic head and to prevent drop-out of the signals. Further, it is possible to overcome the problem of poor rolling shape and condition of the tape caused by protrusion on the edges as seen in the conventional type magnetic tape, to improve the running performance of the tape, to prevent damage of the tape itself, and to ensure more stabilized recording and reproducing operation.

What is claimed is:

1. A method for manufacturing a magnetic tape comprising, cutting the magnetic tape to a predetermined width to form at least one side edge; and thereafter irradiating at least one of an ultraviolet laser or a visible laser beam on the at least one side edge while said magnetic tape is running in a running direction, wherein the irradiating is from a lateral direction along the tape approximately perpendicular to the running direction and wherein at least a part of a protrusion on the at least one side edge is eliminated.

2. A method for manufacturing a magnetic tape according to claim 1, wherein spatial intensity distribution is given to at least one of ultraviolet laser and visible laser to be irradiated to the at least one side edge of said magnetic tape.

3. A method for manufacturing a magnetic tape according to claim 1, wherein said ultraviolet laser or said visible laser beam is pulsed light, and the following conditions are satisfied:

$$Ts \leq Pf \times LBw$$

where Pf represents pulse frequency, Ts represents running speed of said magnetic tape, and LBw represents irradiating width of said ultraviolet laser or said visible laser in the running direction of said magnetic tape.

4. A method for manufacturing a magnetic tape according to claim 2, wherein said ultraviolet laser or said visible laser beam is pulsed light, and the following conditions are satisfied:

$$Ts \leq Pf \times LBw$$

where Pf represents pulse frequency, Ts represents running speed of said magnetic tape, and LBw represents irradiating width of said ultraviolet laser or said visible laser in the running direction of said magnetic tape.

5. The method of claim 1 wherein the at least one side edge of the magnetic tape after being irradiated with said laser beam has approximately a rectangular cross-section.

6. The method of claim 2, wherein the at least one side edge of the magnetic tape after being irradiated with said laser beam has approximately rectangular cross-section.

7. The method of claim 3, wherein the at least one side edge of the magnetic tape after being irradiated with said laser beam has approximately rectangular cross-section.

8. The method of claim 4, wherein the at least one side edge of the magnetic tape after being irradiated with said laser beam has approximately rectangular cross-section.

9. The method of claim 1, wherein the at least one side edge of the magnetic tape after being irradiated with said laser beam has approximately circular cross-section.

10. The method of claim 2, wherein the at least one side edge of the magnetic tape after being irradiated with said laser beam has approximately circular cross-section.

11. The method of claim 3, wherein the at least one side edge of the magnetic tape after being irradiated with said laser beam has approximately circular cross-section.

12. The method of claim 4, wherein the at least one side edge of the magnetic tape after being irradiated with said laser beam has approximately circular cross-section.

13. The method of claim 1 wherein the cutting is achieved by using a metal rotary cutter.

14. The method of claim 1 wherein the tape has two side edges.

15. The method of claim 14 wherein the irradiating is on two side edges.

* * * * *